United States Patent
Badge et al.

(10) Patent No.: US 9,665,653 B2
(45) Date of Patent: May 30, 2017

(54) PRESENTATION OF CONTEXTUAL INFORMATION IN A CO-BROWSING ENVIRONMENT

(71) Applicant: Avaya Inc., Basking Ridge, NJ (US)

(72) Inventors: Gaurav Moreshwar Badge, Pune (IN); Deep Subhash Pai, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 208 days.

(21) Appl. No.: 13/788,071

(22) Filed: Mar. 7, 2013

(65) Prior Publication Data

US 2014/0258889 A1 Sep. 11, 2014

(51) Int. Cl.
*G06F 17/30* (2006.01)

(52) U.S. Cl.
CPC .............. *G06F 17/30873* (2013.01)

(58) Field of Classification Search
CPC .................................................. G06F 3/04842
USPC .................. 709/203, 217, 227; 707/E17.116, 707/E17.001, 769
See application file for complete search history.

(56) References Cited

U.S. PATENT DOCUMENTS

| | | | |
|---|---|---|---|
| 5,862,330 A | 1/1999 | Anupam et al. | |
| 6,199,096 B1 | 3/2001 | Mirashrafi et al. | |
| 6,295,551 B1 | 9/2001 | Roberts et al. | |
| 6,353,817 B1 * | 3/2002 | Jacobs et al. | 706/50 |
| 6,668,273 B1 | 12/2003 | Rust | |
| 6,871,213 B1 * | 3/2005 | Graham et al. | 709/205 |
| 7,287,054 B2 | 10/2007 | Lee et al. | |
| 7,979,909 B2 | 7/2011 | Jancula et al. | |
| 8,682,977 B1 | 3/2014 | Roy et al. | |
| 2002/0032731 A1 | 3/2002 | Qian | |
| 2002/0049812 A1 | 4/2002 | Nahon | |
| 2003/0225836 A1 | 12/2003 | Lee et al. | |
| 2004/0225716 A1 | 11/2004 | Shamir et al. | |
| 2005/0097159 A1 | 5/2005 | Skidgel | |
| 2005/0197922 A1 | 9/2005 | Pezaris et al. | |
| 2005/0251006 A1 | 11/2005 | Dellis | |
| 2006/0129642 A1 | 6/2006 | Qian et al. | |
| 2006/0149567 A1 | 7/2006 | Muller | |
| 2007/0143423 A1 | 6/2007 | Kieselbach | |
| 2008/0046976 A1 | 2/2008 | Zuckerberg | |
| 2008/0052377 A1 | 2/2008 | Light | |
| 2008/0127276 A1 | 5/2008 | Kim | |
| 2009/0125329 A1 * | 5/2009 | Kuo | 705/3 |
| 2009/0164581 A1 | 6/2009 | Bove et al. | |
| 2009/0328135 A1 | 12/2009 | Szabo et al. | |
| 2010/0082747 A1 | 4/2010 | Yue et al. | |

(Continued)

FOREIGN PATENT DOCUMENTS

WO 2012131688 A2 10/2012

*Primary Examiner* — Jeffrey A Gaffin
*Assistant Examiner* — Mandrita Brahmachari (57) ABSTRACT

Embodiments described herein provide systems and methods for presenting contextual information in a co-browsing environment. In a particular embodiment, a method provides receiving an instruction in a co-browsing server to initiate a co-browsing session for a website with a first client and a second client. The method further provides determining contextual information related to a user of the first client and the website. The method further provides presenting the website at the first client and presenting the website at the second client, wherein an indication of the contextual information is overlaid on the website at the second client.

18 Claims, 10 Drawing Sheets

(56) References Cited

U.S. PATENT DOCUMENTS

| | | |
|---|---|---|
| 2010/0131868 A1 | 5/2010 | Chawla et al. |
| 2010/0218105 A1 | 8/2010 | Perov et al. |
| 2010/0250756 A1 | 9/2010 | Morris |
| 2010/0306642 A1 | 12/2010 | Lowet et al. |
| 2010/0306834 A1 | 12/2010 | Grandison |
| 2010/0318571 A1 | 12/2010 | Pearlman |
| 2011/0083101 A1 | 4/2011 | Sharon |
| 2011/0119352 A1 | 5/2011 | Perov et al. |
| 2011/0126290 A1 | 5/2011 | Krishnamurthy et al. |
| 2011/0202881 A1 | 8/2011 | Singh |
| 2011/0258316 A1 | 10/2011 | Rizk |
| 2011/0313915 A1 | 12/2011 | Tang |
| 2012/0005567 A1* | 1/2012 | Burckart et al. ............. 715/234 |
| 2012/0005598 A1 | 1/2012 | Burckart et al. |
| 2012/0030288 A1 | 2/2012 | Burckart et al. |
| 2012/0047449 A1 | 2/2012 | Burckart et al. |
| 2012/0110472 A1 | 5/2012 | Amrhein |
| 2012/0210244 A1 | 8/2012 | de Francisco Lopez |
| 2012/0245955 A1 | 9/2012 | Bari |
| 2012/0284801 A1 | 11/2012 | Goodwin et al. |
| 2012/0303702 A1 | 11/2012 | Richter et al. |
| 2012/0303703 A1 | 11/2012 | Richter et al. |
| 2013/0091172 A1 | 4/2013 | Kelesis |
| 2013/0129074 A1 | 5/2013 | Peterson et al. |
| 2013/0129075 A1 | 5/2013 | Whitaker |
| 2013/0176333 A1 | 7/2013 | Agar et al. |
| 2013/0205375 A1 | 8/2013 | Woxblom et al. |
| 2013/0218964 A1 | 8/2013 | Jakobson |
| 2014/0019534 A1 | 1/2014 | Handrigan et al. |
| 2014/0053085 A1 | 2/2014 | Stephure et al. |
| 2014/0195588 A1 | 7/2014 | Badge et al. |
| 2014/0207872 A1 | 7/2014 | Roy et al. |
| 2014/0237425 A1* | 8/2014 | Chan et al. ................... 715/810 |
| 2014/0258889 A1 | 9/2014 | Badge et al. |
| 2015/0142573 A1 | 5/2015 | Chien et al. |

\* cited by examiner

FIGURE 3

500 www.examplebank.com/insurance_app

Example Bank

Email Address

First Name

Last Name

Street Address (City, State, Zip)

Insurance Type

Medical History    ◯ Hypertension  ◯ Heart
                   ◯ Smoking       ◯ Mental Premium Type       ◯ Monthly       ◯ Annually Date of Birth      [  ] / [  ] / [mm/dd/yyyy]

Medications

☐ I have read and agree to the terms of service.

Click here for agent assistance

CANCEL    SUBMIT

FIGURE 5 www.examplebank.com/insurance_app

Example Bank

Email Address: joe@email

First Name: John

Last Name: Doe

Street Address (City, State, Zip): Springfield, CO, 11111

Medical History: ● Hypertension ○ Heart ○ Smoking ○ Mental

Premium Type: ○ Monthly ● Annually

Date of Birth: 01 / 01 / 1980  mm/dd/yyyy

Medications: Blood Pressure Meds

☐ I have read and agree to the terms of service.

[CANCEL]  [SUBMIT]

Co-Browsing Toolbar | Exit Co-Browsing | Settings

PRESENTATION OF CONTEXTUAL INFORMATION IN A CO-BROWSING ENVIRONMENT

TECHNICAL BACKGROUND

Modern websites allow a user to accomplish a myriad of tasks online from the user's computing device whether the device be a laptop, desktop, smartphone, tablet, or otherwise. These tasks may include retrieving information, purchasing items, creating content, communicating with other users, or any other online activity. While a website allows a user to accomplish one or more tasks, the website does not allow for multiple users to have the same experience without those users present at the same computing device.

To address the above issue, co-browsing systems exist that allow multiple devices to view interactions with a website across the multiple devices. While these co-browsing systems allow both users to view a synchronized website, there may be other useful information to a user beyond what is presented in the website. The user would have to go outside of the co-browsing environment to retrieve and/or view this information.

Overview

Embodiments described herein provide systems and methods for presenting contextual information in a co-browsing environment. In a particular embodiment, a method provides receiving an instruction in a co-browsing server to initiate a co-browsing session for a website with a first client and a second client. The method further provides determining contextual information related to a user of the first client and the website. The method further provides presenting the website at the first client and presenting the website at the second client, wherein an indication of the contextual information is overlaid on the website at the second client.

In some embodiments, determining the contextual information comprises determining an identity of the user of the first client, identifying topics from content of the website, and retrieving the contextual information from at least one database based on the identity of the user of the first client and the identified topics.

In some embodiments, the contextual information includes a selectable item associated with at least one of the identified topics, and the method further provides receiving a selection of the selectable item from a user of the second client.

In some embodiments, the method provides inserting the contextual information into the website as metadata associated with corresponding topics of the identified topics.

In some embodiments, the method provides transferring the contextual information to the second client.

In some embodiments, the indication of the contextual information comprises a plurality of graphical identifiers, wherein each graphical identifier of the plurality of graphical identifiers visually corresponds to a portion of the website displaying a topic of the identified topics.

In some embodiments, the method provides receiving a selection of a graphical identifier of the plurality of graphical identifiers from a user of the second client and displaying contextual information associated with the selected graphical identifier.

In some embodiments, the method provides receiving a selection of a show-all graphical identifier of the plurality of graphical identifiers and displaying contextual information associated with all graphical identifiers of the plurality of graphical identifiers.

In some embodiments, the indication of the contextual information comprises a plurality of graphical displays, wherein each graphical display of the plurality of graphical displays provides a portion of the contextual information and visually corresponds to a portion of the website displaying a topic of the identified topics.

In some embodiments, the method provides receiving an instruction from a user of the second client indicating a portion of the contextual information to share with the user of the first client and transferring the portion of the contextual information to the first client for presentation to the user of the first client.

In another embodiment a co-browsing server is provided that includes a communication interface configured to receive an instruction in a co-browsing server to initiate a co-browsing session for a website with a first client and a second client. The co-browsing server further includes a processing system configured to determine contextual information related to a user of the first client and the website, enable presentation of the website at the first client, and enable presentation of the website at the second client, wherein an indication of the contextual information is overlaid on the website at the second client.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
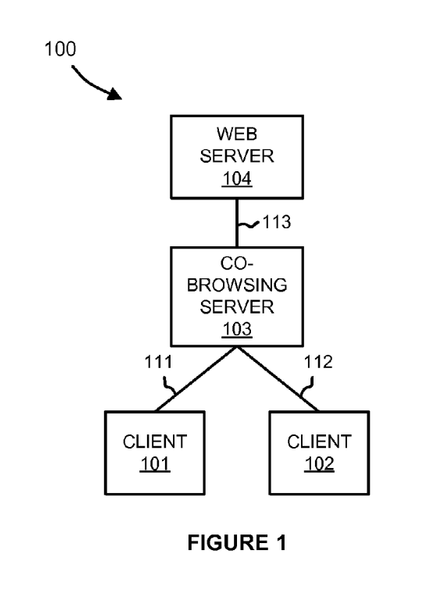
FIG. 1 illustrates a co-browsing system for presenting contextual information in a co-browsing environment.

FIG. 1 illustrates co-browsing system 100. Co-browsing system 100 includes client 101, client 102, co-browsing server 103, and web server 104. Client 101 and co-browsing server 103 communicate over communication link 111. Client 102 and co-browsing server 103 communicate over communication link 112. Co-browsing server 103 and web server 104 communicate over communication link 113.

In operation, clients 101 and 102 are executing on computing devices, such as laptop computers, desktop computers, tablet computers, and smartphones. Clients 101-102 may be executing within a web browsing application that is also executing on their respective computing devices or may be independent applications. Clients 101 and 102 may be installed as extensions or plugins within their respective web browsers or software for the clients may be transferred from co-browsing server 103 as needed. Client software may take the form of a web standard, such as HTML 5 or Java, so that the web browser on a device does not require additional plugins or extensions in order to execute clients 101 and 102. Alternatively, the client software may comprise a stand-alone application or take some other form depending on the co-browsing platform used by co-browsing server 103. While a typical web browsing application is able to retrieve a website from web server 104, clients 101 and 102 allow for their respective users to view each other's interactions with a website from web server 104.

In some embodiments, clients 101 and 102 each render the website separately for display while in other embodiments co-browsing server 103 renders the website and transfers a rendered image of the website to clients 101 and 102 for display. Other methods of performing a co-browsing session may also be used. Clients 101 and 102 exchange communication with co-browsing server 103 to synchronize website interactions across clients 101 and 102. For example, if a user types information into the website on client 101, that information will also show as being entered into the website on client 102.

Figure 2:
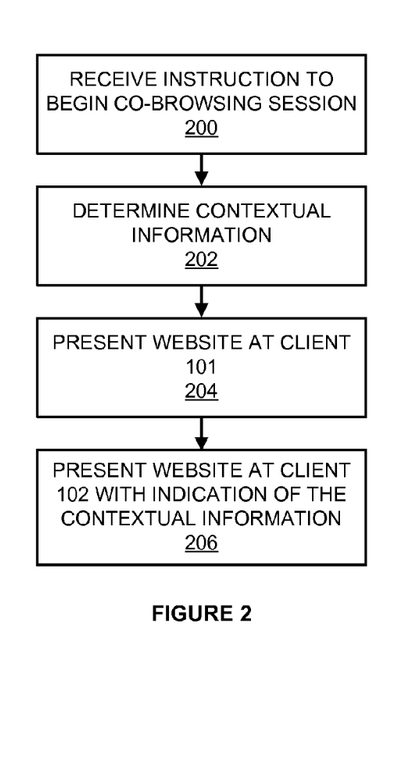
FIG. 2 illustrates an operation of the co-browsing system for presenting contextual information in a co-browsing environment.

FIG. 2 illustrates the operation of co-browsing system 100 for presenting contextual information in a co-browsing environment. Co-browsing server 103 receives an instruction to initiate a co-browsing session for a website with a first client and a second client (step 200). The instruction may include a web address for retrieving the website from web server 104, identifiers for clients that will participate in the co-browsing session, and any other information that may be useful when establishing a co-browsing session. The instruction may be received from the computing device executing either client 101 or client 102. The instruction may be transferred in response to a user input. For example, a user of a first computing device may select a link in a website, email message, or elsewhere, that directs the first computing device to open client 1 and connect with co-browsing server 103. Alternatively, the user may open client 1 and indicate within client 1 that the user desires to establish a co-browsing session of a website by providing the website and identifiers for other clients that will participate the session.

After receiving the instruction, co-browsing server 103 determines contextual information related to a user of client 301 and the website (step 202). The contextual information may be any information that provides context to the website. Specifically, the contextual information may include information that will aid a user of client 302 when participating in a co-browsing session with the user of client 301. For example, the requested website may be a website of a company of which the user of client 301 is a customer and the user of client 302 is a representative of that company tasked with assisting the customer in navigation of the website. In that situation, the contextual information may include information about elements of the website beyond the information for those elements normally presented in the website. Moreover, that element information may further include information that particularly concerns the customer operating client 301.

The contextual information may be retrieved from multiple sources, such as one or more databases that may be located within co-browsing server 103, web server 104, or some other data server system in communication with co-browsing server 103 over a communication network. The contextual information may be retrieved from information related to past website activity by the user of client 101, information related to an account of the user of client 101 with the website or co-browsing server 103, information concerning the relationship of the user of client 101 with a company or entity represented by the website, social media, or from any other source that can provide information about the user of client 101. The contextual information may include text information, audio information, video information, pictorial or other graphical information, web links, or any other type of information—including combinations thereof.

Client 101 presents the website to the user(s) of client 101 (step 204). The website may be retrieved from web server 104 with or without being transferred through co-browsing server 103 and then rendered at client device 101. The rendering engine used at client 101 may be the same as or different than the rendering engine used at client 102. Alternatively, co-browsing server 103 may receive the website from web server 104, render the website, and transfer the rendered website image to client 101. Other methods of presenting websites in a co-browsing environment may also be used. A rendering engine uses content information and formatting information to generate an image of a website. The content information may be received from web server 104 in HyperText Markup Language (HTML), Extensible Markup Language (XML), image files, or some other format—including combinations thereof. The formatting information may be received from web server 104 in Cascading Style Sheets (CSS), Extensible Stylesheet Language (XSL), or some other format—including combinations thereof. Examples of a browser engine may include Webkit, Gecko, Trident, or any other browser engine.

The website is also presented at client 102 with an indication of the contextual information overlaid on the website at the second client (step 206). The underlying website may be presented at client 102 in the same way that the website is presented at client 101, as discussed above. In order to be overlaid on the website, the contextual information may be transferred to client 102 from co-browsing server 103 in metadata for the website, metadata for the co-browsing session, in a separate message, or some other means of transferring electronic information. Indicators for individual items of the contextual information may be presented on the website in visual correlation to a corresponding topic displayed in the content of the website. In other words, an indicator for a particular item of contextual information may be displayed on the website in such a manner as to indicate to a user of client 102 that the item of contextual information corresponds to a particular topic of content on the website. For example, each indicator for items of contextual information may be displayed next to a displayed topic on the website.

In some embodiments, the indicators of items of contextual information comprise the respective items of contextual information. For example, the contextual information may include a block of text presented over at least a portion of the website. In other embodiments, the indicators do not display the contextual information and the user of client 102 performs an action with the indicator, such as clicking on the indicator, hovering a cursor over the indicator, tapping on the indicator in the case of a touch screen user interface, or any other method user input for item selection, to display the corresponding item of contextual information.

In some embodiments, one or more items of contextual information may include a selectable item(s) for the user of client 102. The selectable items may perform some action within client 102, co-browsing server 103, web server 104, the computer system upon which client 102 is executing, or on some other computer system—including combinations thereof. For example, the selectable item could be a link to another website, a request for more information, an instruction to open a mapping application, an instruction to input a new event in a calendar application, an instruction to send an email to a particular address, an instruction for a proprietary system or application to perform an action, or any other type of user selectable item—including combinations thereof.

Advantageously, presentation of the contextual information overlaid on the website may enhance the participation of the user of client 102 in the co-browsing session with the user of client 101. Even if information includes information that would be otherwise available to the user of client 102 through other means, the presentation of the contextual information overlaid on the website allows the contextual information to be more readily available to the user of client 102 and may provide information that the user of client 102 would not think to look for.

It should be understood that while the embodiments discussed above include only two clients, the embodiments could be expanded to include any number of clients. In those expanded embodiments, the website may be displayed at the other clients either with or without the contextual information overlaid on the website depending on the settings for each respective additional client.

Referring back to FIG. 1, clients 101 and 102 are executing on respective computing devices that each comprise computer processing circuitry and communication circuitry. The communication circuitry may be wireless communications, wireline communications, or both. The computing devices may each also include a user interface, memory device, software, or some other communication components. The computing devices may each be a telephone, computer, e-book, mobile Internet appliance, media player, game console, or some other computing apparatus—including combinations thereof.

Co-browsing server 103 comprises a computer system and a communication interface. Co-browsing server 103 may also include other components such a router, data storage system, and power supply. Co-browsing server 103 may reside in a single device or may be distributed across multiple devices. Co-browsing server 103 is shown externally to web server 104, but co-browsing server 103 could be integrated within the components of web server 104.

Web server 104 comprises a computer system and communication interface. Web server 104 may also include other components such a router, data storage system, power supply, and any further components that may be used for providing websites to web browsing applications. Web server 104 may reside in a single device or may be distributed across multiple devices.

Communication links 111-113 use metal, glass, air, space, or some other material as the transport media. Communication links 111-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-113 could be direct links or may include intermediate networks, systems, or devices.

Figure 3:
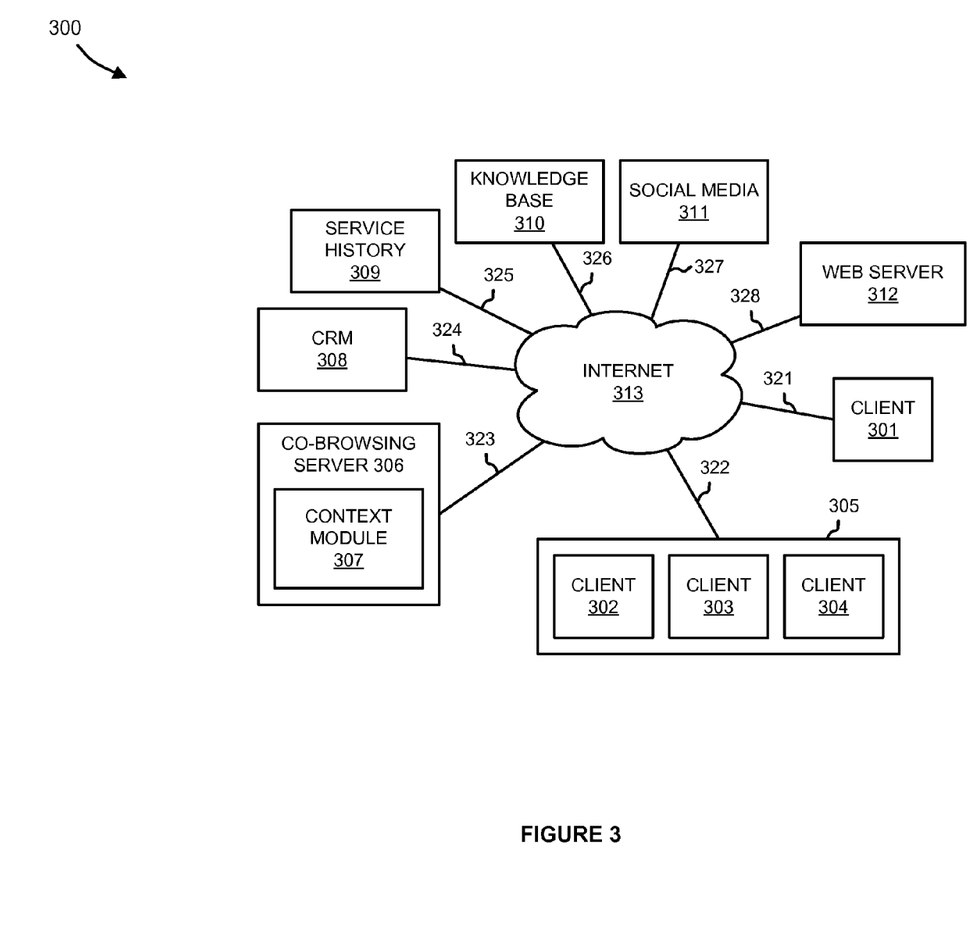
FIG. 3 illustrates a co-browsing system for presenting contextual information in a co-browsing environment.

FIG. 3 illustrates co-browsing system 300. Co-browsing system 300 includes client 301, clients 302-304 located within support center 305, co-browsing server 306, customer relationship management (CRM) database 308, service history database 309, knowledge base 310, social media database 311, web server 312, and Internet 313. Co-browsing server 306 includes context module 307. Client 301 and Internet 313 communicate over communication link 321. Support center 305 and Internet 313 communicate over communication link 322. Co-browsing server 306 and Internet 313 communicate over communication link 323. Databases 308-311 and Internet 313 communicate over communication links 324-327, respectively. Web server 312 and Internet 308 communicate over communication link 324.

While shown separately, the functionality of web server 307 and co-browsing server 306 may be incorporated within one another or may be collocated such that they communicate over a local area network rather than Internet 313. Similarly, support center 305 and either web server 312, co-browsing server 306, or both may be collocated. Alternatively, support center 305 may be a virtual center with clients 302-304 distributed in multiple locations and accessing Internet 308 on separate links. Additionally, client 301, support center 305, co-browsing server 306, web server 312 may access Internet 313 through one or more access providers.

One or more of databases 308-311 may be collocated with each other, co-browsing server 306, or web server 312. Thus, co-browsing server 306 may communicate with one or more of databases 308-311 over communication links that do not involve Internet 313.

In operation, agents operate clients 302-304 to assist customers or, some other type of user, with issues that the customer may have. In some embodiments, support center 305 may be associated with an entity from which the customer requires support. For example, web server 308 may include a website for a company and support center 305 provides support to customers using the company's website. If necessary, co-browsing server 306 may be used for an agent operating one of clients 302-304 to provide the customer with website support.

Figure 4:
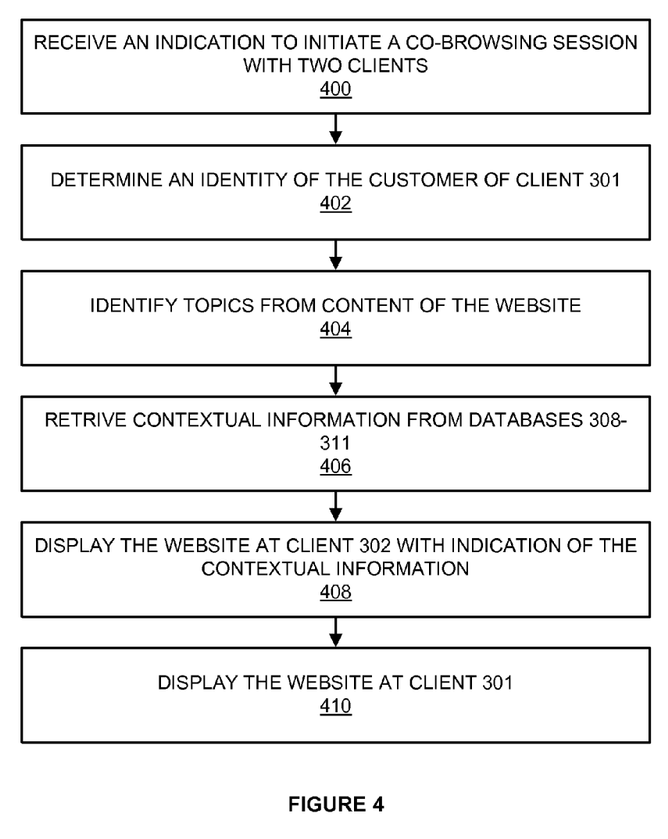
FIG. 4 illustrates an operation of the co-browsing system for presenting contextual information in a co-browsing environment.

FIG. 4 illustrates the operation of co-browsing system 300 for presenting contextual information in a co-browsing environment. Co-browsing system receives an indication to initiate a co-browsing session between two clients (Step 400). In this example, a customer that is operating client 301 desires to participate in a co-browsing session with an agent operating one of clients 302-304 in support center 305. The desire may arise from difficulty navigating a website provided by web server 307, from a lack of knowledge of the website's features, or for any other reason that the customer may desire assistance.

The indication to initiate the co-browsing session may be received from an agent of support center 305 or from a customer. For example, the customer may click a link on a web page, or elsewhere, that initiates the co-browsing session with an agent. Similarly, if a customer is already communicating with an agent, then the agent may transfer a link to the client for the client to initiate the co-browsing session. The link may be transferred over email, instant messaging, client-to-client messaging, or any other way of transferring a link. The content of the link may be generated by co-browsing system 306 itself, by a client, by web server 307, or by some other system or application. The information necessary to initiate the co-browsing session may be included in the link, may direct co-browsing server 306 to a location containing the information, may be a code that corresponds to parameters created for the co-browsing session, or any other method of providing the co-browsing server with information necessary to initiate a co-browsing session.

In this embodiment, the request to initiate a co-browsing session indicates to co-browsing server 301 should initiate a co-browsing session between client 301 and client 302. Client 302 may be selected from support center clients 302-304 based on the agent operating client 302 already communicating with the customer operating client 301. Alternatively, if the agent is not already communicating with the customer, then a client may be randomly chosen, selected based on an agent distribution algorithm, or some other method for selecting a support center agent. An agent may communicate with the customer using a traditional voice phone, a web call, a video conference, a chat window displayed in a web browser window or elsewhere, or any other means of communicating between two parties.

After receiving the request to initiate the co-browsing session, context module 307 determines contextual information that should be displayed to the agent on client 302 in order to aid the agent when assisting the customer (steps 402-406). In particular, context module 307 determines an identity of the customer operating client 301 (step 402). The identity may be determined from login information that the customer uses to access the website or co-browsing server 103 or from other information provided by the user. The other information provided by the user, such as name, date of birth, etc., may be entered into the website, entered into client 101, entered into client 102 by a user of client 102, or any other means of entering user information. The information may be provided by the user of client 101 in response to a prompt by the website or by client 101 at the request of co-browsing server 306. Other methods of determining the identity of the customer may also be used.

In addition to determining the identity of the user of client 301, context module 307 identifies topics from content of the website (step 404). The topics may be identified by scanning the contents of the website to determine topics included in the content. For example, the scanning may search for key words/phrases of text or certain pictures or graphics that correspond to topics. Alternatively, the topics may be identified through information provided by web server 104, or some other computer system that is aware of the contents of the website, that indicates the various topics presented in the website. In some embodiments, the topics may be provided to context module after the request for the co-browsing session is received at co-browsing server 306. In other embodiments, the may be provided at some point before co-browsing server receives the request from client 301. For example, co-browsing server 306 may be associated with the website and the web server in such a way that the topics are provided to context module 307 in advance. Such may be the case if co-browsing server 306 is set up to specifically handle agent-customer co-browsing sessions for the website through support center 305.

Once the user's identity is determined and the topics are identified, contextual information is retrieved from one or more of databases 308-311 based on the identity and topics (step 406). In other words, items of contextual information are retrieved from databases 308-311 and each item relates both to a topic presented in the content of the website and the identity of the user of client 301, in this example that user is the customer. Items of contextual information relate to the identity of the user by relating to any aspect of the user including general aspects, such as gender, or more specific aspects, such as the user's past website usage history, information about the user's past interactions with the entity that owns the website, social media information (e.g. status postings), or any other information concerning the user.

Specifically, in this example, an item of the contextual information may include information that can be used by the agent operating device 302 when assisting the customer during the co-browsing session, such as how a particular topic affects the customer's situation. One or more items of contextual information concerning the customer's relationship with the entity for which the customer is receiving website support from CRM database 308. CRM database 308 may provide information concerning the customer's purchase history, marketing history, appointment history, or any other information relating to the customer's relationship with the entity. Service and support history information for the customer may be obtained from service history database 309. The service and support history information may include only history of the customer dealing with support center 305 or may include additional support history information. Additional information related to the customer and/or topic(s) may be obtained from knowledge base 310. Furthermore, information about the customer's relation to one or more topics may be retrieved from social media database 311. The social media information may include information, such as posted pictures/videos, status updates, comments, or other types of information that is available via the customer's social networking accounts. Additional social media databases may exist if the customer has more than one social media accounts that can be accessed by co-browsing server 307.

Once the contextual information is retrieved, contextual module 307 provides the contextual information to client 302 so that client 302 can display the website at least an indication of the contextual information opverlaid on the website as the website is displayed by client 302. In one embodiment, contextual module 307 transfers the context information to client 302 in addition to website information that client 302 uses to render the website. In another embodiment, co-browsing server may render the website information itself and transfer the rendered website image to client 302. In that embodiment, contextual module 307 may overlay an indication of the contextual information on the rendered image before transferring the rendered image to client 302 or may transfer the contextual information to client 302 along with the image for overlay of a contextual information indication by client 302. In further embodiments, the contextual information may be overlaid on the website content by modifying the website information itself before the website is rendered by either co-browsing server 306 or client 302.

After receiving the contextual information transferred from co-browsing server 306, client 302 displays the website with the indication of the contextual information (step 408). The contextual information indication may be any type of visual indicator over the content of the website that indicates the presence of contextual information. Individual items of contextual information may each have a separate identifier and each of those identifiers may be positioned on the website in a manner that clearly indicates to a user the topic of the website to which the item of contextual information pertains. If the contextual information indicators themselves do not display the contextual information, then the agent can select one or more indicators in order to display the item(s) of contextual information associated therewith.

Additionally, while the website is being displayed at client 302 with the indication of the contextual information, the website is also displayed at client 301 (step 410). The website is displayed at client 301 without the contextual information that is displayed to the agent operating client 302. After the website is displayed at both client 301 and 302, the customer and the agent can both interact with the website and have their respective actions synchronized between the two clients.

In some embodiments, if an interaction causes a change in content such that new contextual information may exist for the topics presented in the new content, then the new contextual information is received and displayed by client 302. For example, the new content may comprise a new page of the website. Repeating steps 402-408 described above may determine the new contextual information. Alternatively, the new contextual information may have already been determined with the previous contextual information in anticipation that the new website content may be displayed.

Similarly, in some embodiments, additional contextual information may be determined and displayed by client 302 in response to input into the website. For example, the user my type an entry into a field of the website and contextual information related to that entry may be determined and displayed. The new contextual information may be indicated by a new indicator(s) or may simply replace the contextual information in previously displayed indicators.

Figure 5:
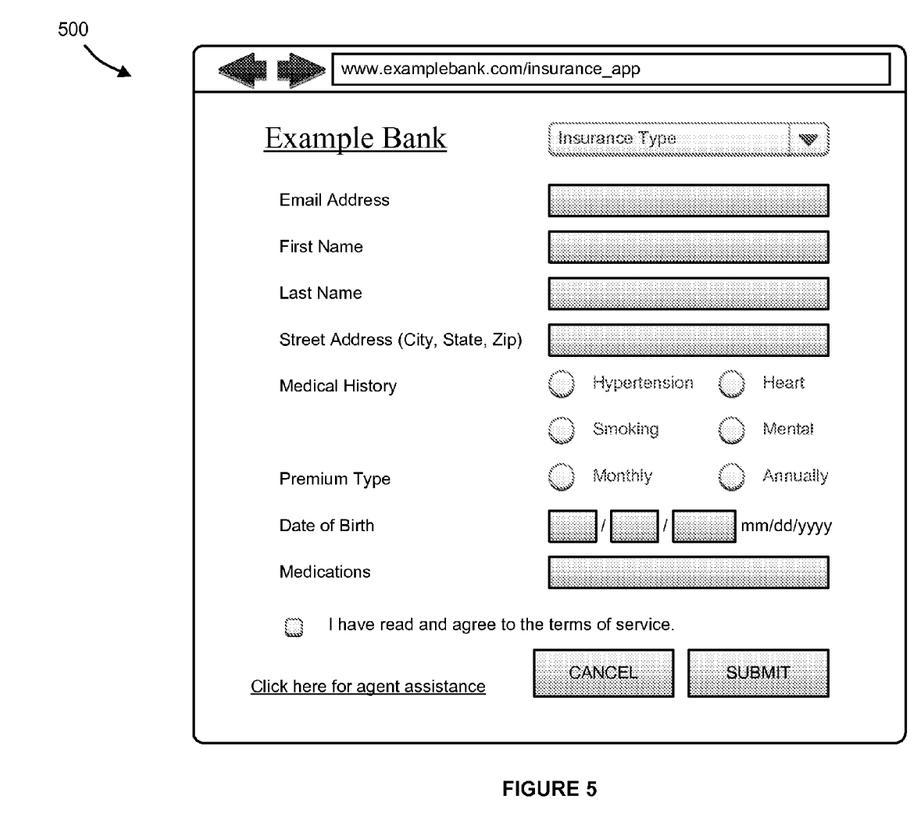
FIG. 5 illustrates a browser window for presenting contextual information in a co-browsing environment.

FIG. 5 illustrates web browser window 500 in an example of the above method. Web browser window 500 is displayed on a computing device of a customer trying to order something on a website, www.examplebank.com/insurance_app, and is a window of a web browser application executing on the computing device. The website is retrieved by the web browser from web server 312 without using co-browsing server 306 since a co-browsing session has not yet been initiated. Likewise, after receiving the website, the web browser application itself renders the website for display in window 500.

In this example, the customer is currently viewing the account creation form page of the website. The lower left corner of window 500 displays a link so that the customer clicks on the link to receive agent assistance with the website. Upon selecting the link, a message is sent to co-browsing server 306 to initiate a co-browsing session with an agent of the website. In addition to initializing a co-browsing session for the website, the link may open a chat window so that the customer can interact with the agent with which the customer will be co-browsing. Alternatively, the customer may be prompted to provide a telephone number so that the agent can call the customer during the co-browsing session. Other forms of communication between the customer and the agent may also be used.

Figure 6:
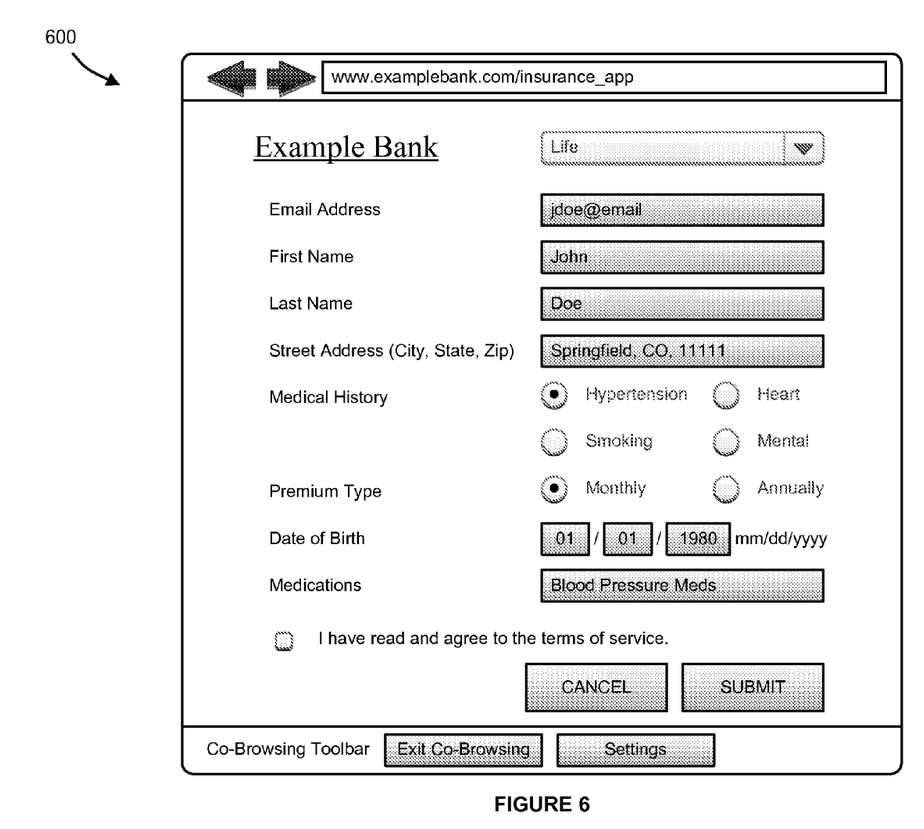
FIG. 6 illustrates a browser window for presenting contextual information in a co-browsing environment.

FIG. 6 illustrates web browser window 600 displaying the website to the customer during a co-browsing session. Co-browsing server 306 may receive indication that the customer clicked the link by receiving a message from web server 308 that the link was clicked, the link itself may have directed to co-browsing server 306, or any other method that an indication may be routed to co-browsing server 306.

After receiving notification that the customer clicked on the link, co-browsing server transfers information needed for the web browser on the customer's device to execute co-browsing client 301. The information may include the software for client 301 itself if client 301 is not already installed in the customer's web browser. Co-browsing client 301 may execute in web browser window 600 using standard web protocols, such as HTML5, so that the web browser does not need any plugins, extensions, or other modification to run client 301. Alternatively, client 301 may execute using Java, Flash, or any other type of web environment. Web browser window 600 may be the same web browser window as web browser window 500 or may be a new window opened in response to the customer clicking the link.

The co-browsing toolbar at the bottom of web browser window 600 indicates to the customer that web browser window 600 is displaying and executing client 301. While FIG. 6 displays the toolbar for client 301 at the bottom of window 600, the toolbar may assume any other position and take any other form to indicate that client 301 is executing. In addition to indicating that client 301 is executing, the toolbar may provide options for controlling client 301. For example, the co-browsing toolbar of FIG. 6 displays buttons to exit the co-browsing session and bring up a settings menu. Exiting the co-browsing session closes client 301 after which web browser window 600 may be closed as well, reload the co-browsed website normally, go to a start page, or any other type of action that can be taken by a web browser. The settings menu may include options for display resolution of web pages, privacy settings for filters 310 and 312 in co-browsing server 306, or any other options that may be beneficial for a user in a co-browsing session.

Window 600 illustrates that fields of the webpage have received information. The information presented in the fields may have been entered by the customer into client 301 or by the agent into customer 302 and then synchronized between the two clients by co-browsing server 306.

Figure 7:
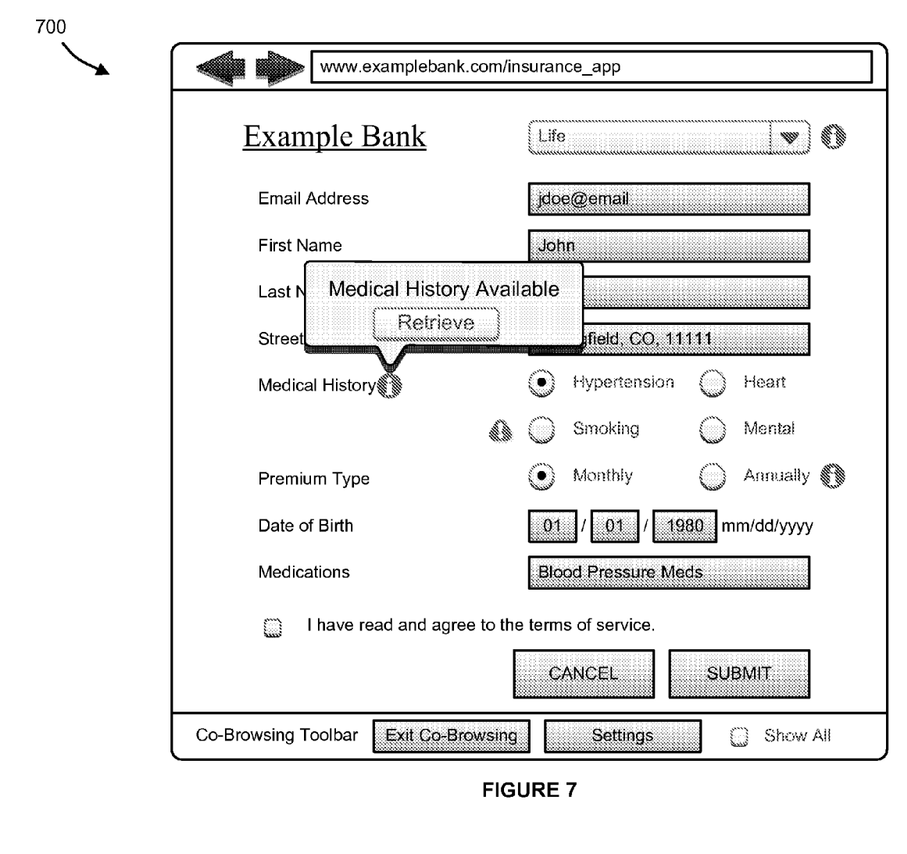
FIG. 7 illustrates a browser window for presenting contextual information in a co-browsing environment.

FIG. 7 illustrates web browser window 700 executing client 302 and displaying the website to the agent during the co-browsing session. Window 700 displays the same information in the fields of the webpage as does window 600 due to the synchronization by co-browsing server 306. However, unlike webpage displayed by client 301 in window 600, the webpage displayed in window 700 also includes indicators of contextual information items overlaid on the website content. In this embodiment, two types of indicators are present, the 'i' indicator corresponds to normal contextual information while the '!' indicator corresponds to more important contextual information. While this embodiment uses two indicator types, more or fewer indicator types may be used for other levels of importance or to otherwise indicate different types or categories of contextual information. The indicators in this example are positioned next to the content of the website displaying the respective topics of the corresponding items of contextual information. Placing the indicators next to each topic displays to the agent a correspondence between each indicator and respective topic. Other means of indicating such a correspondence may also be used.

Furthermore, if the agent wants to view an item of contextual information associated with one of the indicators, then the agent selects one of the indicators. Window 700 shows that the agent in this example selects the indicator that corresponds to the medical history topic of the webpage. A popup bubble of contextual information is displayed in response to the selection. The context information in the popup bubble shows that the medical history of the customer is available for the agent and provides a selectable button for the agent to retrieve that history. A similar bubble will popup in response to the agent selecting any one of the other indicators of contextual information. Means of displaying the contextual information other than the popup bubble may also be used.

The toolbar for client 302 shown at the bottom of browser window 700 is similar to the toolbar of client 301. However, client 302 also has a "Show All" checkbox. When checked the "Show All" checkbox will force all items of contextual information to be displayed from their respective indicators. The "Show All" checkbox is not checked in window 700 and, therefore, only individually selected items of contextual information is displayed. While the "Show All" checkbox is provided in the toolbar, client 302 may instead overlay the "Show All" checkbox onto the website along with the other indicators of the contextual information. It should also be understood that show-all functionality may be indicated using means other than a checkbox.

Figure 8:
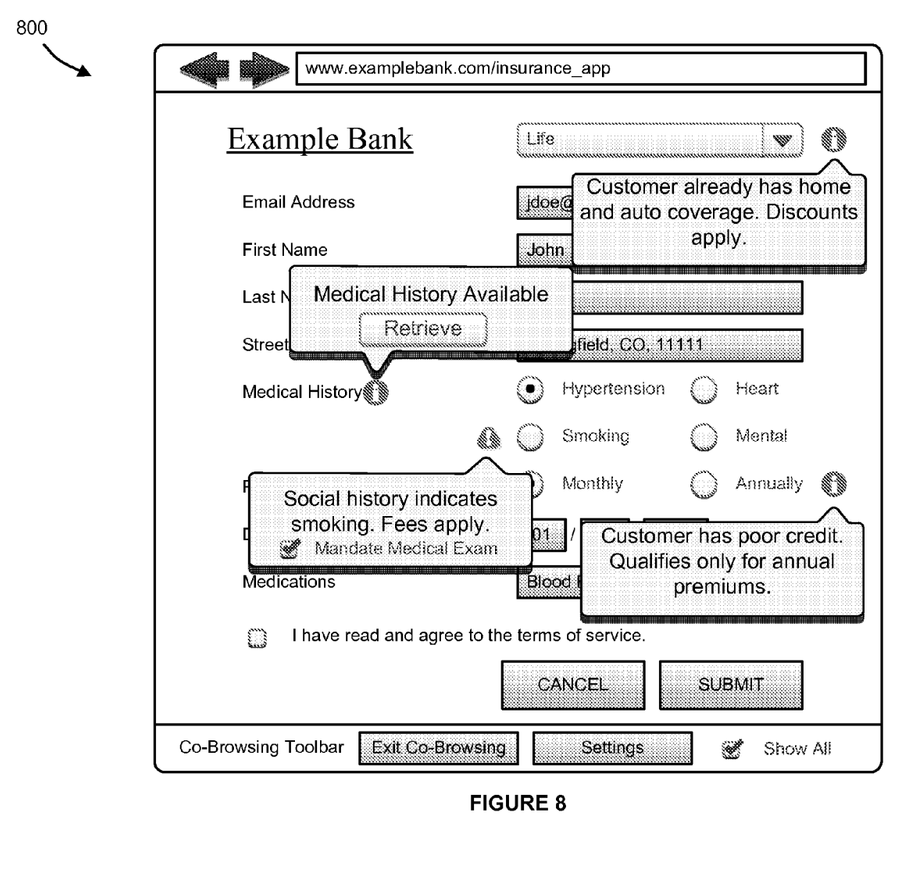
FIG. 8 illustrates a browser window for presenting contextual information in a co-browsing environment.

FIG. 8 illustrates web browser window 800 executing client 302 and displaying the website to the agent during the co-browsing session. Unlike in window 700, the "Show All" checkbox is checked so that all items of the contextual information are displayed. Specifically, in addition to the medical history item, items of contextual information are displayed for the topics of insurance type, premium type, and smoking history. In this example, the insurance type item of contextual information provides that the customer already has home and auto insurance coverage, which means the customer is eligible for discounts when applying for life insurance. This item of information may serve as a reminder to the agent to apply the discounts and/or to notify the customer that the customer is so eligible. Also, the premium type item of contextual information indicates that the customer has poor credit and does not qualify for monthly premiums. Thus, the agent will need to inform the customer of this and have the customer change his or her selection to yearly. Since this is a co-browsing session, the Agent may also perform the selection of yearly premiums and have the selection synchronized with the website displayed at client 301 via co-browsing server 306.

The last topic item, smoking, is marked as important because the contextual information item associated indicates that the customer is indeed a smoker despite the customer's input, or lack thereof, to the contrary. The information was retrieved from social media database 311 and may have been inferred by context module 307 based on information for the customer stored thereon. Moreover, the item of contextual information includes a checkbox that the agent is able to check in order to mandate a medical exam before granting coverage to confirm the customer's smoking status. A notification of the checked mandate may be transferred to the appropriate system or application that is able to process such mandates.

Figure 9:
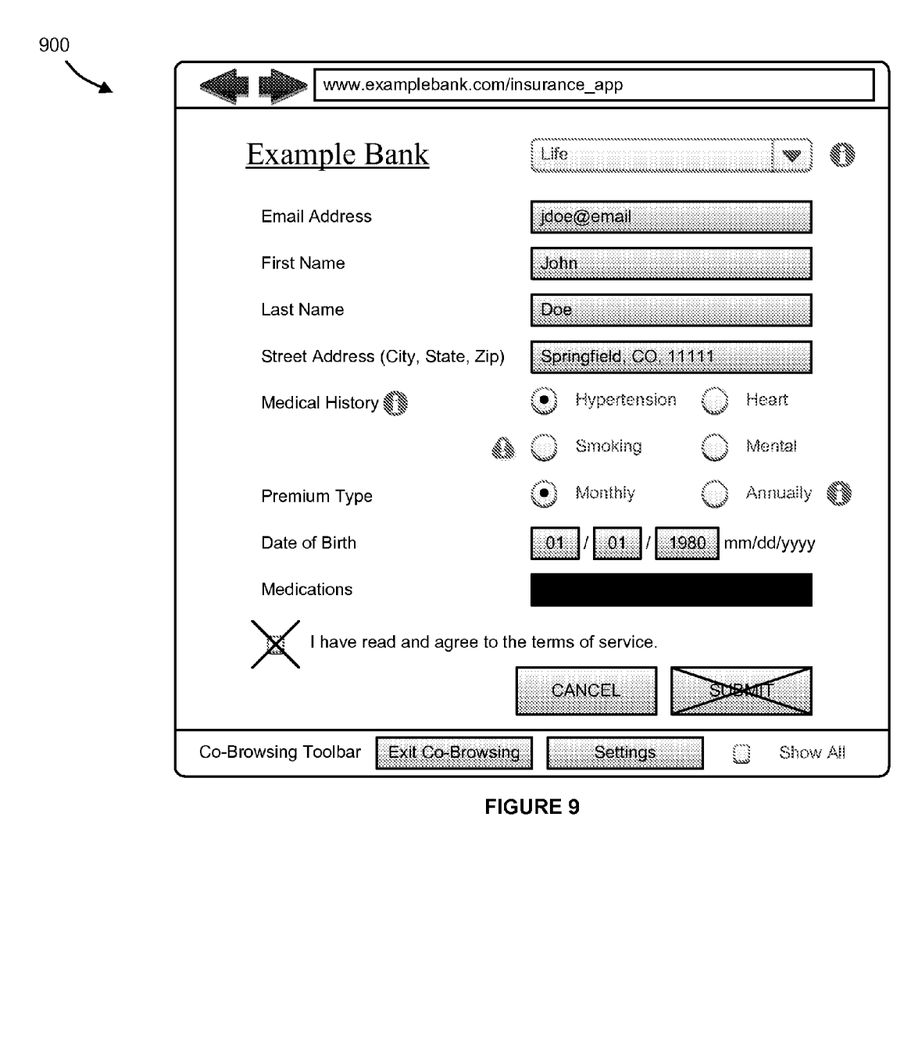
FIG. 9 illustrates a browser window for presenting contextual information in a co-browsing environment.

FIG. 9 illustrates web browser window 900 executing client 302 and displaying the website to the agent during the co-browsing session. Window 900 is similar to windows 700 and 800 but has some information obscured as being private information. Additionally, the terms of service checkbox and the submit button cannot be selected by the agent. While displayed as a black bar and a pair of Xs, such privacy settings may be indicated to the agent in other manners. The customer at client 301 may configure these privacy settings in order to ensure the agent is unable to view certain information or select certain items. The privacy settings may also be configured by default based on the nature of the obscured or prohibited fields.

Figure 10:
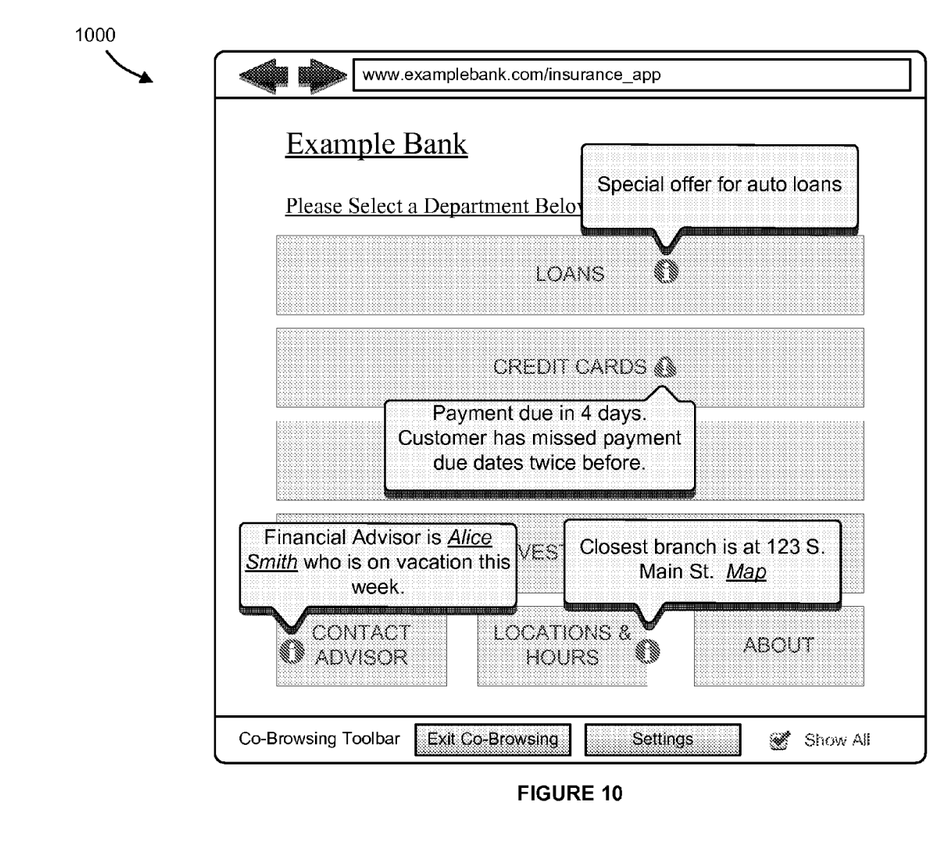
FIG. 10 illustrates a browser window for presenting contextual information in a co-browsing environment.

FIG. 10 illustrates web browser window 1000 executing client 302 and displaying a different webpage to the agent during the co-browsing session. Window 1000 is an example of a webpage that may be co-browsed by the customer and agent other than the application form discussed in the figure above. Though not illustrated client 301 will also display the same webpage without the contextual information. In this example, the "Show All" checkbox is selected an all items of contextual information are displayed next to their respective indicators. Specifically, the contextual information corresponding to the loans topic provides that Example Bank has a special offer for the customer on auto loans. The contextual information corresponding to the credit card topic provides that the customer has a payment due in 4 days and that the customer has missed payments twice before. The contextual information corresponding to the contact an advisor topic provides that the customer's advisor is Alice Smith and she is on vacation this week. A link to retrieve more information about Alice Smith is also provided. The contextual information corresponding to the location and hours topic provides that the closest branch to the customer is located at 123 South Main Street and also provides a link to a map of the branch location. The agent can use any of the contextual information when assisting the customer during the co-browsing of the webpage displayed in window 800.

Figure 11:
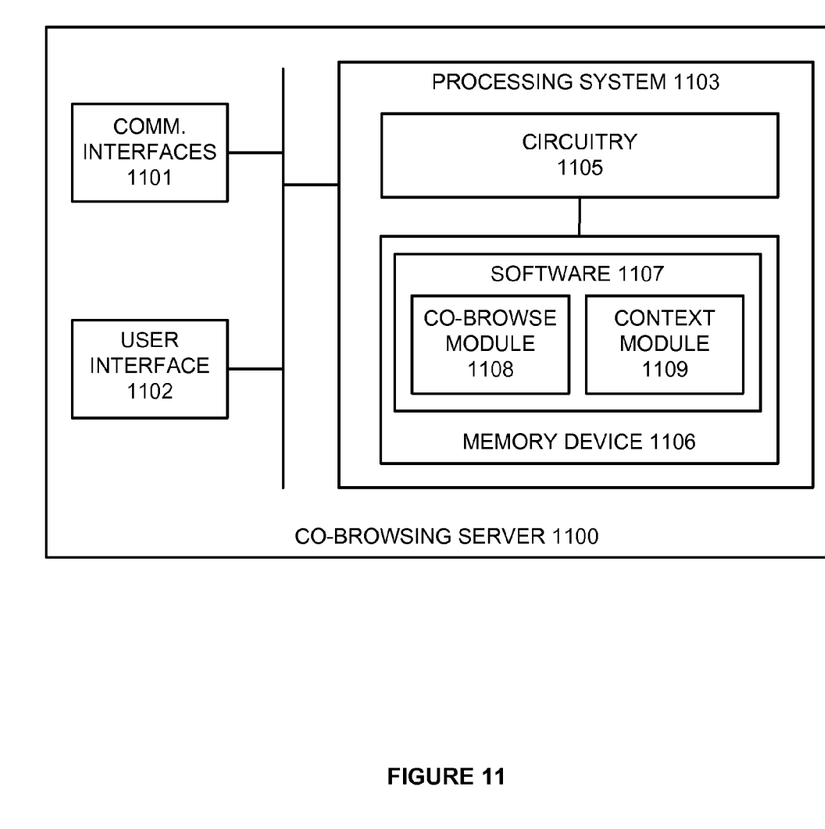
FIG. 11 illustrates a co-browsing server for presenting contextual information in a co-browsing environment.

FIG. 11 illustrates co-browsing server 1100. Co-browsing server 1100 is an example of co-browsing server 103, although server 103 may use alternative configurations. Co-browsing server 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user. User interface 1102 may include a keyboard, display screen, mouse, touch pad, or some other user input/output apparatus. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Operating software 1107 comprises computer programs, firmware, or some other form of machine-readable processing instructions. Operating software includes co-browsing module 1108 and context module 1109. Operating software 1107 may further include an operating system, utilities, drivers, network interfaces, applications, or some other type of software. When executed by circuitry 1105, operating software 1107 directs processing system 1103 to operate co-browsing server 1100 as described herein.

In particular, co-browsing module 1108 directs processing system 1103 to receive an instruction to initiate a co-browsing session for a website with a first client and a second client. Context module 1109 directs processing system 1103 to determine contextual information related to a user of the first client and the website. Co-browsing module 1108 directs processing system 1103 to enable presentation of the website at the first client. Co-browsing module 1108 and context module 1109 direct processing system 1103 to enable presentation of the website at the second client, wherein an indication of the contextual information is overlaid on the website at the second client.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a co-browsing system, comprising:
   receiving an instruction in a co-browsing server to initiate a co-browsing session for a website with a first client and a second client;
   determining, based on an identity of a user of the first client, contextual information related to the user of the first client and the website;
   transferring the website without the contextual information to the first client to present the website at the first client without contextual information; and
   transferring the website with the contextual information to the second client to present the website at the second client, wherein an indication of the contextual information is overlaid on the website at the second client.

2. The method of claim 1, wherein determining the contextual information comprises:
   determining the identity of the user of the first client;
   identifying topics displayed in the content of the website; and
   retrieving the contextual information from at least one database based on the identity of the user of the first client and the identified topics.

3. The method of claim 2, wherein the contextual information includes a selectable item associated with at least one of the identified topics, and further comprising:
   receiving a selection of the selectable item from a user of the second client.

4. The method of claim 2, further comprising:
   inserting the contextual information into the website as metadata associated with corresponding topics of the identified topics.

5. The method of claim 2, wherein the indication of the contextual information comprises a plurality of graphical identifiers, wherein each graphical identifier of the plurality of graphical identifiers visually corresponds to a portion of the website displaying a topic of the identified topics.

6. The method of claim 5, further comprising:
   receiving a selection of a graphical identifier of the plurality of graphical identifiers from a user of the second client; and
   displaying contextual information associated with the selected graphical identifier.

7. The method of claim 5, further comprising:
   receiving a selection of a show-all graphical identifier of the plurality of graphical identifiers; and
   displaying contextual information associated with all graphical identifiers of the plurality of graphical identifiers.

8. The method of claim 2, wherein the indication of the contextual information comprises a plurality of graphical displays, wherein each graphical display of the plurality of graphical displays provides a portion of the contextual information and visually corresponds to a portion of the website displaying a topic of the identified topics.

9. The method of claim 1, further comprising:
   receiving an instruction from a user of the second client indicating a portion of the contextual information to share with the user of the first client; and
   transferring the portion of the contextual information to the first client for presentation to the user of the first client.

10. A co-browsing server, comprising:
    one or more non-transitory computer readable storage media;
    a processing system operatively coupled with the one or more computer readable storage media; and
    program instructions stored on the one or more computer readable storage media that, when read and executed by the processing system, direct the processing system to:
    receive an instruction in a co-browsing server to initiate a co-browsing session for a website with a first client and a second client;
    determine, based on an identity of a user of the first client, contextual information related to the user of the first client and the website;
    transfer the website without the contextual information to the first client to enable presentation of the website at the first client without the contextual information; and
    transfer the website with the contextual information to the second client to enable presentation of the website at the second client, wherein an indication of the contextual information is overlaid on the website at the second client.

11. The co-browsing server of claim 10, wherein to determine the contextual information the program instructions direct the processing system to:
    determine the identity of the user of the first client;
    identify topics displayed in the content of the website; and
    retrieve the contextual information from at least one database based on the identity of the user of the first client and the identified topics.

12. The co-browsing server of claim 11, wherein the contextual information includes a selectable item associated with at least one of the identified topics, and the program instructions further direct the processing system to:
    receive a selection of the selectable item from a user of the second client.

13. The co-browsing server of claim 11, to transfer the website with the contextual information to the second client the program instructions direct the processing system to insert the contextual information into the website as metadata associated with corresponding topics of the identified topics.

14. The co-browsing server of claim 11, wherein the indication of the contextual information comprises a plurality of graphical identifiers, wherein each graphical identifier of the plurality of graphical identifiers visually corresponds to a portion of the website displaying a topic of the identified topics.

15. The co-browsing server of claim 14, wherein the second client receives a selection of a graphical identifier of the plurality of graphical identifiers from a user of the second client and displays contextual information associated with the selected graphical identifier.

16. The co-browsing server of claim 14, wherein the second client receives a selection of a show-all graphical identifier of the plurality of graphical identifiers and displays contextual information associated with all graphical identifiers of the plurality of graphical identifiers.

17. The co-browsing server of claim 11, wherein the indication of the contextual information comprises a plurality of graphical displays, wherein each graphical display of the plurality of graphical displays provides a portion of the contextual information and visually corresponds to a portion of the website displaying a topic of the identified topics.

18. The co-browsing server of claim 10, wherein the program instructions further direct the processing system to:
receive an instruction from a user of the second client indicating a portion of the contextual information to share with the user of the first client and transfer the portion of the contextual information to the first client for presentation to the user of the first client.

* * * * *